United States Patent
Chen et al.

(10) Patent No.: US 10,024,647 B2
(45) Date of Patent: Jul. 17, 2018

(54) METHOD OF AIR REFRACTIVE INDEX CORRECTION FOR ABSOLUTE LONG DISTANCE MEASUREMENT

(71) Applicant: ZHEJIANG SCI-TECH UNIVERSITY, Zhejiang (CN)

(72) Inventors: Benyong Chen, Zhejiang (CN); Shihua Zhang, Zhejiang (CN); Liping Yan, Zhejiang (CN)

(73) Assignee: ZHEJIANG SCI-TECH UNIVERSITY, Zhejiang (CN)

( * ) Notice: Subject to any disclaimer, the term of this patent is extended or adjusted under 35 U.S.C. 154(b) by 0 days.

(21) Appl. No.: 15/537,432

(22) PCT Filed: May 17, 2016

(86) PCT No.: PCT/CN2016/082279
§ 371 (c)(1),
(2) Date: Jun. 19, 2017

(87) PCT Pub. No.: WO2017/133128
PCT Pub. Date: Aug. 10, 2017

(65) Prior Publication Data
US 2018/0045500 A1 Feb. 15, 2018

(30) Foreign Application Priority Data
Feb. 4, 2016 (CN) .......................... 2016 1 0078210

(51) Int. Cl.
*G01B 9/02* (2006.01)
(52) U.S. Cl.
CPC ..... *G01B 9/02007* (2013.01); *G01B 9/02008* (2013.01); *G01B 9/02062* (2013.01); *G01B 2290/60* (2013.01)
(58) Field of Classification Search
None
See application file for complete search history.

(56) References Cited

U.S. PATENT DOCUMENTS 5,082,364 A * 1/1992 Russell .................. G01S 17/36
356/5.15
5,153,669 A * 10/1992 DeGroot ................ G01D 5/266
356/489
(Continued)

FOREIGN PATENT DOCUMENTS

CN 104655025 5/2015

OTHER PUBLICATIONS

Tan, Jiubin, et al. "Identification and elimination of half-synthetic wavelength error for multi-wavelength long absolute distance measurement." Measurement Science and Technology 22.11 (2011): 115301.*
(Continued)

*Primary Examiner* — Tri Ton
*Assistant Examiner* — Rufus Phillips
(74) *Attorney, Agent, or Firm* — JCIPRNET

(57) ABSTRACT

A method of air refractive index correction for an absolute long distance measurement adopting a two-color method based on a single wavelength and a synthetic wavelength is provided. Two lasers emit two laser beams with a constant single wavelength and a variable wavelength, respectively, to form a synthetic wavelength chain from large to small through a laser interferometric system. Each order of the synthetic wavelength chain is used to obtain a series of the estimate values of optical distance with gradually increasing accuracy. After optical distances corresponding to a minimum synthetic wavelength and a single wavelength are obtained simultaneously, the corrected absolute distance is achieved according to the principle of the two-color method for air refractive index correction. The method can realize full-path correction of air refractive index along the actual path of the distance measurement, and has low requirements (Continued)

on the measurement precision of environmental parameters such as temperature and pressure.

2 Claims, 1 Drawing Sheet

(56) References Cited

U.S. PATENT DOCUMENTS

| | | | | |
|---|---|---|---|---|
| 5,172,185 | A | * | 12/1992 | Leuchs .................. H01S 5/0687 356/482 |
| 2007/0024859 | A1 | * | 2/2007 | Bodermann ........... G01N 21/45 356/498 |
| 2011/0211198 | A1 | * | 9/2011 | Koda .................. G01B 9/02004 356/499 |
| 2013/0258348 | A1 | * | 10/2013 | Yan ........................ G01N 21/45 356/484 |

OTHER PUBLICATIONS

Wu, Guanhao, et al. "High-accuracy correction of air refractive index by using two-color heterodyne interferometry of optical frequency combs." Measurement Science and Technology 24.1 (2012): 015203.*

* cited by examiner

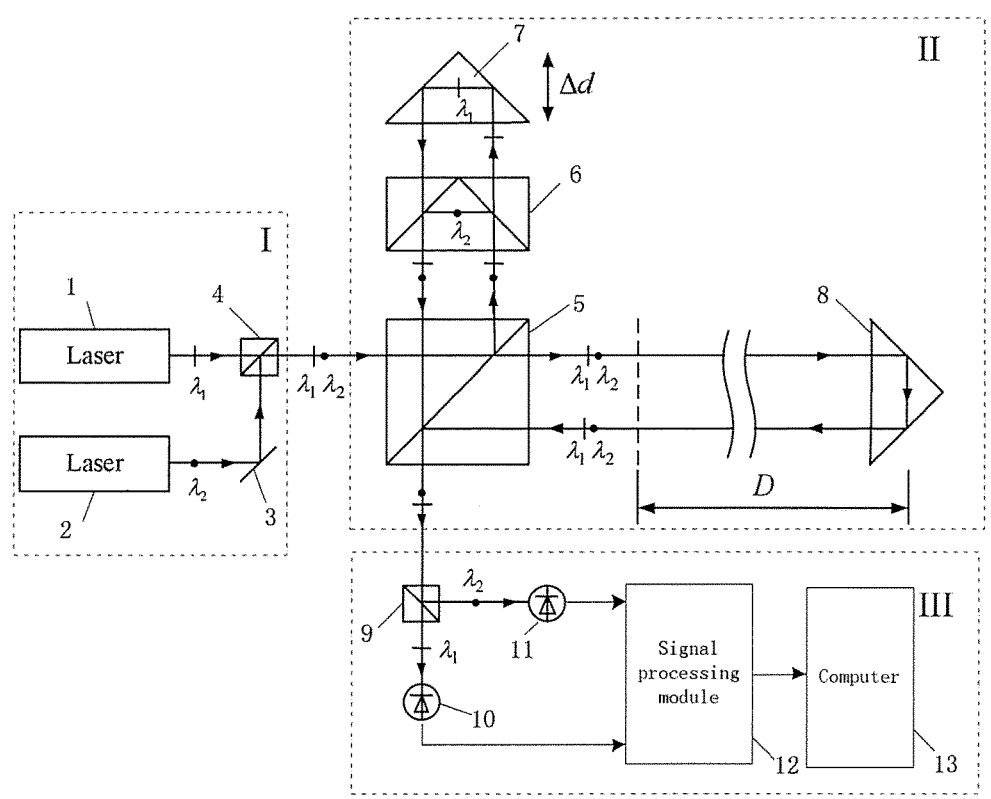

METHOD OF AIR REFRACTIVE INDEX CORRECTION FOR ABSOLUTE LONG DISTANCE MEASUREMENT

CROSS-REFERENCE TO RELATED APPLICATION

This application is a 371 of international application of PCT application serial no. PCT/CN2016/082279, filed on May 17, 2016, which claims the priority benefit of China application no. 201610078210.1, filed on Feb. 4, 2016. The entirety of each of the abovementioned patent applications is hereby incorporated by reference herein and made a part of this specification.

BACKGROUND OF THE INVENTION

Technical Field

The present invention relates to a method of correcting the refractive index of air for an absolute distance measurement, and particularly relates to, a method of air refractive index correction for an absolute long distance measurement.

Description of Related Art

The scale of laser interferometric distance measurement is the laser wavelength which is equal to the product of the laser wavelength in vacuum and the refractive index of air. In long range absolute distance measurement (an absolute distance of greater than 1 m), the achievable accuracy of distance measurement is usually not limited by the stability of the laser wavelength but depends on the precision measurement of environmental parameters. Thus, the uncertainty of laser interferometric distance measurement is mainly contributed by the uncertainty of the air refractive index measurement. To obtain accurate distance measurement result, it is essential to know the real-time refractive index of air along the optical path. The commonly used method for air refractive index measurement and compensation is the PTF method, that is, the temperature, pressure, humidity and $CO_2$ concentration in air are determined by corresponding sensors, and then the refractive index of air is calculated using the Edlén equations. In laboratory with well controlled environments, the accuracy of the Edlén equations is about $1 \times 10^{-8}$. However, the accuracy of the PTF method is limited by the instability and nonuniformity of the air quality. The temperature changes and gradients are faster and more localized than the variations of other parameters under the general laboratory or workshop environments. The pressure and humidity variations also need to be considered in the extreme industrial applications with strong air disturbance. In traditional methods for air refractive index measurement, the temperature can be determined only at single point, at several points or along a line adjacent to the optical path, and the temperature gradients are difficult to determine with one or several thermometers. The response times of the thermometers are rather long from several seconds to a few minutes, thus fast temperature changes can not be determined in time. The refractive index of air measured by the refractometers is also at a given time and place, not the real value of the refractive index of air along the whole optical path on which the distance is measured by laser interferometer. Therefore, it is difficult to correct the absolute distance along the precise optical path using the traditional air refractive index measurement and compensation methods due to the temporal variation and spatial distribution of the refractive index of air.

The two-color method for correcting the refractive index of air is a self-correction of the refractive index of air on the basis of length measurements by using different-colored lasers. Using the dispersion relation for air refractive indexes at two wavelengths, the effects of temperature and pressure on the accuracy of distance measurement are greatly reduced, almost negligible. Then the distance measurement results are only affected slightly by the water vapour in air, which can be measured with sufficient accuracy in many cases. Hence, the two-color method is an effective method to realize full-path self-correction of air refractive index for absolute distance measurement over the long range.

The key techniques of the two-color method for correcting the refractive index of air are: the selection of the two wavelengths which determine the value of the A-coefficient (A-coefficient represents the dispersion relation for air refractive indexes at two wavelengths) and the precision measurement of the optical path difference with respect to the two wavelengths. Because the measurement uncertainty of the optical path difference is enlarged by the A-coefficient, the accuracy of the distance correction will be affected. Thus, a smaller A-coefficient will benefit to improve the distance correction accuracy. This demands the two wavelengths with larger wavelength difference. The two wavelengths of a frequency doubled (or tripled) laser source are generally used for the two-color method (e.g. one is the wavelength of visible light, and the other is the wavelength of near-infrared light), then the A-coefficient can decrease and the influence of uncertainties or drifts of the wavelengths on the distance measurement can be reduced to a negligible level. Unfortunately, the wide separation between the two laser wavelengths will introduce errors due to chromatic aberration, thus special lenses and beam splitters in the optical system are needed to reduce such effects. This makes the optical system expensive. Moreover, the laser intensities and the phase fluctuations of interference signals induced by air disturbance will increase the measurement uncertainty of the optical path difference with respect to the two wavelengths with wide separation. The accuracy of the distance correction will then be influenced.

BRIEF SUMMARY OF THE INVENTION

In order to solve the above-mentioned disadvantages in the related art, the present invention aims to disclose a method of air refractive index correction for absolute long distance measurement. A two-color method based on a single wavelength and a synthetic wavelength is adopted to realize the self-correction of air refractive index for absolute distance measurement. And an accurate compensation method of air refractive index is provided for absolute distance measurement over the long range.

To achieve the purpose mentioned above, the present invention adopts the following technical solutions:

(1) The first laser emits a laser beam with a constant single wavelength $\lambda_1$. The second laser sequentially emits a laser beam with a variable wavelength from small to large $\lambda_{21} < \lambda_{22} < \ldots < \lambda_{2i} < \ldots < \lambda_{2n}$. The two laser beams are combined at the first polarizing beam splitter to form an orthogonal linearly polarized beam. The orthogonal linearly polarized beam projects onto the laser interferometric system which is composed of the beam splitter, the second polarizing beam splitter, the first cube-corner prism and the second cube-corner prism.

(2) With the laser interferometric system, the single wavelength $\lambda_1$ and the variable wavelength $\lambda_{21} < \lambda_{22} < \ldots < \lambda_{2i} < \ldots < \lambda_{2n}$ are used to form a synthetic wavelength chain from large to small $\lambda_{S1} > \lambda_{S2} > \ldots > \lambda_{Si} > \ldots > \lambda_{Sn}$, wherein $\lambda_{Si} = \lambda_1 \lambda_{2i}/(\lambda_{2i} - \lambda_1)$, i=1, 2, ..., n. A series of estimate values of optical distance $L_{S1}, L_{S2}, \ldots, L_{Si}, \ldots, L_{Sn}$ with gradually increasing measurement accuracy can be obtained in turn, and each order of the synthetic wavelength chain complies with a transition condition of $u(L_{S(i-1)}) < \lambda_{Si}/4$, wherein $u(L_{S(i-1)})$ is an uncertainty of the estimate value $L_{S(i-1)}$ of optical distance which is determined by using an i-1$^{th}$ order synthetic wavelength $\lambda_{S(i-1)}$, and i=2, 3, ..., n.

(3) The half of the first order synthetic wavelength $\lambda_{S1}$ must be larger than the optical distance L corresponding to the absolute distance D, i.e. $\lambda_{S1}/2 > L$. The uncertainty $u(L_{Sn})$ corresponding to the minimum synthetic wavelength $\lambda_{Sn}$ must be smaller than a quarter of the single wavelength $\lambda_1$, i.e. $u(L_{Sn}) < \lambda_1/4$.

(4) The optical distances $L_{Sn}$ and $L_1$ separately corresponding to the minimum synthetic wavelength $\lambda_{Sn}$ and the single wavelength $\lambda_1$ is obtained simultaneously. According to the principle of the two-color method for air refractive index correction, the absolute distance is obtained by $$D = L_{Sn} - A_{S1}(L_{Sn} - L_1)$$

wherein the A-coefficient $A_{S1}$ is defined as follows:

$$A_{S1} = (n_{Sn} - 1)/(n_{Sn} - n_1)$$

in which $n_{Sn}$ and $n_1$ are the air refractive indexes corresponding to $\lambda_{Sn}$ and $\lambda_1$, respectively, and they can be calculated using the Edlén equations.

The wavelengths of the laser beams emitted by the first laser and the second laser belong to the same spectral band. And the minimum synthetic wavelength $\lambda_{Sn}$ is constructed by two single wavelengths $\lambda_1$ and $\lambda_{2n}$ in the same spectral band.

Compared with the technique background of the invention, the present invention has the advantages that:

(1) The two-color method based on a single wavelength and a synthetic wavelength is used for the self-correction of air refractive index in absolute long distance measurement. The full-path correction of air refractive index along the actual propagation path of the laser beam is realized. And the variations of the environmental parameters, such as temperature and pressure, have little influence on the accuracy of air refractive index correction.

(2) Due to the large difference between the minimum synthetic wavelength $\lambda_{Sn}$ and the single wavelength $\lambda_1$, the corresponding A-coefficient is small, which is helpful to improve the accuracy of air refractive index correction using the two-color method.

(3) The two laser wavelengths $\lambda_{2n}$ and $\lambda_1$ which are used to construct the minimum synthetic wavelength $\lambda_{Sn}$ belong to the same spectral band, and their values are close. Thus, the influences of the laser intensities and the phase fluctuations of interference signals induced by air disturbance in the measurement environment on the accuracy of the distance correction are effectively reduced. Special lenses and beam splitters are no longer needed which are used to reduce the effects of chromatic aberration in the two-color method with wavelengths of different spectral bands, thus the complexity and cost of the optical system are decreased.

(4) The optical distances $L_{Sn}$ and $L_1$ corresponding to the minimum synthetic wavelength $\lambda_{Sn}$ and the single wavelength $\lambda_1$ are measured simultaneously with high accuracy.

Thus, the influence of optical distance measurement error on the accuracy of air refractive index correction using the two-color method is reduced.

The present invention has the advantages of large range distance measurement, high distance correction accuracy and full-path correction of air refractive index along the actual path of the distance measurement. Furthermore, it has low requirement on the measurement precision of environmental parameters such as temperature and pressure and is easy to realize.

BRIEF DESCRIPTION OF THE DRAWINGS

FIG. 1 is the schematic of the method of air refractive index correction for absolute long distance measurement.

In the figure: 1. first laser, 2. second laser, 3. reflector, 4. first polarizing beam splitter, 5. beam splitter, 6. second polarizing beam splitter, 7. first cube-corner prism, 8. second cube-corner prism, 9. third polarizing beam splitter, 10. first photodetector, 11. second photodetector, 12. signal processing module, 13. computer. The vertical short line in the light path represents the beam with the wavelength $\lambda_1$ whose polarization direction is parallel to the page plane, and the black dot represents the beam with the wavelength $\lambda_2$ whose polarization direction is perpendicular to the page plane.

DETAILED DESCRIPTION OF THE INVENTION

The present invention is further described in details hereinafter with the figure and embodiment.

As shown in the FIG. 1, the embodiment of the present invention comprises a light source system I, a laser interferometric system II and an interference signal processing system III. The specific implementation process is as follows:

The light source system I comprises a first laser 1, a second laser 2, a reflector 3 and a first polarizing beam splitter 4. The first laser 1, which is one tunable diode laser, emits a laser beam with a constant single wavelength $\lambda_1$ and the polarization direction parallel to the page plane. The second laser 2, which is another tunable diode laser, emits a laser beam with a variable wavelength $\lambda_2$ and the polarization direction perpendicular to the page plane. The value of the variable wavelength $\lambda_2$ is changed by adjusting the driving voltage of the piezoelectric transducer or the operating current of the diode laser. The laser beam emitted by the first laser 1 is directed to the first polarizing beam splitter 4, and the laser beam emitted by the second laser 2 is reflected by the reflector 3 and projects onto the first polarizing beam splitter 4. The two laser beams, which are transmitted and reflected by the first polarizing beam splitter 4, respectively, combine into an orthogonal linearly polarized beam.

The laser interferometric system II comprises a beam splitter 5, a second polarizing beam splitter 6, a first cube-corner prism 7 and a second cube-corner prism 8. The orthogonal linearly polarized beam from the light source system I is incident on the beam splitter 5 and divided into the reflected and transmitted beams as the reference beam and the measurement beam, respectively. The reference beam projects onto the second polarizing beam splitter 6. The beam with the wavelength $\lambda_2$ is reflected by the second polarizing beam splitter 6 and projects onto the beam splitter 5. The beam with wavelength $\lambda_1$ passes through the second polarizing beam splitter 6, reflected by the first cube-corner prism 7, passes through the second polarizing beam splitter 6 again and projects onto the beam splitter 5. The measurement beam is reflected by the second cube-corner prism 8 and returns to the beam splitter 5. Being reflected by the beam splitter 5, the measurement beam recombines with the reference beam transmitted by the beam splitter 5 to form an interference beam.

The interference signal processing system III comprises a third polarizing beam splitter 9, a first photodetector 10, a second photodetector 11, a signal processing module 12 and a computer 13. The interference beam from the laser interferometric system II projects onto the third polarizing beam splitter 9. The interference beam with the wavelength $\lambda_1$ transmitted by the third polarizing beam splitter 9 is received by the first photodetector 10, and the interference beam with the wavelength $\lambda_2$ reflected by the third polarizing beam splitter 9 is received by the second photodetector 11. The interference signals output by the two photodetectors are respectively sent to the signal processing module 12, and transmitted to the computer 13 after being processed by the signal processing module 12. The distance corrected by the two-color method for air refractive index correction is obtained by calculating in the computer 13.

The laser interferometric system of the embodiment can employ the similar measuring apparatus which is disclosed in the applied publication files of Chinese patent with the patent number of ZL201510100565.1, the title of "Absolute Distance Measurement Apparatus and Method Using Laser Interferometric Wavelength Leverage" and the publication number of 104655025A.

In the embodiment, the first laser 1 is a tunable diode laser (TLB 6304, Newport, USA) which emits a constant single wavelength $\lambda_1$ of 631 nm, and the second laser 2 is another tunable diode laser (DL Pro 633, Toptica, Germany) which emits a variable wavelength $\lambda_2$ with the range of 630 nm-637 nm. The first photodetector 10 and the second photodetector 11 are two PIN photodetectors with the model of S09105. The signal processing module 12 is a high-speed data acquisition card (SIS3316, Struck, Germany), and the computer 13 is a desk computer with the model of Pro4500 made by HP company.

With the FIG. 1, the specific implementation of the method of air refractive index correction for absolute long distance measurement includes the following steps:

1. In the FIG. 1, for the wavelength $\lambda_2$ emitted by the second laser 2, the optical path between the position of the vertical dash line and the beam splitter 5 is equal to the optical path between the second polarizing beam splitter 6 and the beam splitter 5. The position of the vertical dash line is marked as the measurement starting point. The absolute distance D is the geometrical distance between the measurement starting point and the second cube-corner prism 8.

2. The first laser 1 emits a linearly polarized beam with a constant single wavelength $\lambda_1$, and the second laser 2 emits a linearly polarized beam with a variable wavelength $\lambda_2$. Controlling the driving voltage of the piezoelectric transducer and the operating current of the second laser 2 to emit the wavelength $\lambda_{21}$ firstly makes the half of the primary synthetic wavelength $\lambda_{S1}$ formed by the wavelengths $\lambda_1$ and $\lambda_{21}$ larger than the optical distance L corresponding to the absolute distance D.

3. Put the second cube-corner prism 8 at the measurement starting point. Moving the first cube-corner prism 7 makes the phases of the interference signals corresponding to the wavelengths $\lambda_1$ and $\lambda_{21}$ detected by the first photodetector 10 and the second photodetector 11 equal to zero simultaneously. At this case, the phase difference $\Delta\varphi$ between the two interference signals is equal to zero. The position of the first cube-corner prism 7 is marked as the reference starting point.

4. Put the second cube-corner prism 8 at the measurement ending point (the position of the absolute distance D). At this case, the phase difference of the two interference signals detected by the first photodetector 10 and the second photodetector 11 becomes to $\Delta\varphi'$. Moving the first cube-corner prism 7 again away from the second polarizing beam splitter 6 makes the phases of the two interference signals equal to zero simultaneously again, thus $\Delta\varphi'=0$. Record the displacement of the first cube-corner prism 7 as $\Delta d_1$ whose corresponding optical distance is denoted as $\Delta l_1$. Move the first cube-corner prism 7 back to the reference starting point. Then, the primary synthetic wavelength $\lambda_{S1}$, the single wavelength $\lambda_1$, the optical distance L corresponding to the absolute distance D and $\Delta l_1$ satisfy the wavelength-leverage relationship as follows:

$$\frac{L}{\lambda_{S1}} = \frac{\Delta l_1}{\lambda_1} \quad (1)$$

wherein $\lambda_{S1}=\lambda_1\lambda_{21}/(\lambda_{21}-\lambda_1)$, and $\lambda_1<\lambda_{21}$.

From Eq. (1), by measuring with the primary synthetic wavelength $\lambda_{S1}$, the estimate value of the optical distance corresponding to the absolute distance is obtained as $$L_{S1} = \frac{\lambda_{S1}}{\lambda_1}\Delta l_1 \quad (2)$$

5. Adjusting the driving voltage of the piezoelectric transducer and the operating current of the second laser 2 to emit a series of wavelengths successively from small to large $\lambda_{21}<\lambda_{22}< \ldots <\lambda_{2i}< \ldots <\lambda_{2n}$ which makes the variable wavelength $\lambda_2$ and the single wavelength $\lambda_1$ form a synthetic wavelength chain from large to small $\lambda_{S1}>\lambda_{S2}> \ldots > \lambda_{Si}> \ldots \lambda_{Sn}$. Each order of the synthetic wavelength chain meets the transition condition of $u(L_{S(i-1)})<\lambda_{Si}/4$, wherein $i=2, 3, \ldots, n$ and $u(L_{S(i-1)})$ is the measurement uncertainty of the estimate value $L_{S(i-1)}$ of the optical distance which is measured using the $i-1^{th}$ order synthetic wavelength $\lambda_{S(i-1)}$. As the absolute distance D will cause the phase difference between the two interference signals of the wavelengths $\lambda_{2i}$ and $\lambda_1$ change, moving the first cube-corner prism 7 as described in the step 4 makes the phases of the two interference signals equal to zero simultaneously. Then the $i^{th}$ order synthetic wavelength $\lambda_{Si}$, the single wavelength $\lambda_1$, the optical distance $\Delta l_i$ corresponding to the displacement $\Delta d_i$ of the first cube-corner prism 7 and the optical distance $\Delta L_{Si}$ corresponding to the fractional fringe of $\lambda_{Si}$ satisfy the wavelength-leverage relationship as follows:

$$\Delta L_{Si} = \frac{\lambda_{Si}}{\lambda_1}\Delta l_i \quad (3)$$

wherein $\lambda_{Si}=\lambda_1\lambda_{2i}/(\lambda_{2i}-\lambda_1)$.

As the zero-crossing detection of the phase difference is implemented in one phase period, the relations of $\Delta l_i<\lambda_1/2$ and $\Delta L_{Si}<\lambda_{Si}/2$ is satisfied, and the fractional fringe of the synthetic wavelength $\lambda_{Si}$ is $$\varepsilon_{Si} = \frac{2\Delta L_{Si}}{\lambda_{Si}} = \frac{2\Delta l_i}{\lambda_1} \qquad (4)$$

Because each order of the synthetic wavelength chain complies with the transition condition of $u(L_{S(i-1)}) < \lambda_{Si}/4$, the integral fringe number $M_{Si}$ of the synthetic wavelength $\lambda_{Si}$ is calculated by the computer 13 according to the following equation:

$$M_{Si} = \text{int}\left[\frac{2L_{S(i-1)}}{\lambda_{Si}} + 0.5 - \varepsilon_{Si}\right] \qquad (5)$$

wherein [ ] represents the operation of rounding down.

The estimate value $L_{Si}$ of the optical distance corresponding to the synthetic wavelength $\lambda_{Si}$ is calculated by the computer 13 using the following equation:

$$L_{Si} = (M_{Si} + \varepsilon_{Si}) \cdot \frac{\lambda_{Si}}{2} \qquad (6)$$

Stop adjusting the second laser 2 when the minimum synthetic wavelength $\lambda_{Sn}$ and the single wavelength $\lambda_1$ satisfy the transition condition of $u(L_{Sn}) < \lambda_1/4$.

6. In the last measurement of the step 5, the estimate values of the optical distance corresponding to $\lambda_{Sn}$ and $\lambda_1$ are obtained at the same time. According to Eq. (6), the optical distances corresponding to the minimum synthetic wavelength $\lambda_{Sn}$ and the single wavelength $\lambda_1$ are given by $$L_{Sn} = (M_{Sn} + \varepsilon_{Sn}) \cdot \frac{\lambda_{Sn}}{2} \qquad (7)$$

$$L_1 = (M_1 + \varepsilon_1) \cdot \frac{\lambda_1}{2} \qquad (8)$$

wherein $M_1$ is the integral fringe number of the single wavelength $\lambda_1$ and $\varepsilon_1$ is the fractional fringe of the single wavelength $\lambda_1$.

According to the wavelength-leverage relationship:

$$\frac{\Delta L_{Sn}}{\lambda_{Sn}} = \frac{\Delta l_n}{\lambda_1} \qquad (9)$$

wherein $\Delta L_{Sn}$ is the optical distance corresponding to the fractional fringe of the minimum synthetic wavelength $\lambda_{Sn}$, and $\Delta l_n$ is the optical distance corresponding to the displacement $\Delta d_n$ of the first cube-corner prism 7. Then it can be obtained that the fractional fringes of $\lambda_1$ and $\lambda_{Sn}$ are equal, that is $$\varepsilon_1 = \varepsilon_{Sn} = \frac{2\Delta l_n}{\lambda_1} \qquad (10)$$

wherein $\varepsilon_1$ and $\varepsilon_n$ are the fractional fringes of $\lambda_1$ and $\lambda_{Sn}$, respectively.

7. The optical distances $L_{Sn}$ and $L_1$ measured by using the minimum synthetic wavelength $\lambda_{Sn}$ and the single wavelength $\lambda_1$ are used for the two-color method of air refractive index correction, then the absolute distance is obtained by $$D = L_{Sn} - A_{S1}(L_{Sn} - L_1) \qquad (11)$$

wherein $A_{S1} = (n_{Sn}-1)/(n_{Sn}-n_1)$ is the A-coefficient which represents the dispersion relation for air refractive indexes at the two wavelengths $\lambda_1$ and $\lambda_{Sn}$, and $n_{Sn}$ is the group refractive index of $\lambda_{Sn}$ which can be expressed as $$n_{Sn} = n_1 - \lambda_1 \frac{n_1 - n_2}{\lambda_1 - \lambda_{2n}} \qquad (12)$$

wherein $n_1$ and $n_2$ are the air refractive indexes corresponding to $\lambda_1$ and $\lambda_{2n}$, respectively, and they can be calculated using the Edlén equations.

The absolute distance D is calculated by the computer 13 according to Eq. (11).

Substituting Eqs. (7) and (8) into Eq. (11), the absolute distance using the two-color method is expressed as $$D = (1 - A_{S1}) \cdot (M_{Sn} + \varepsilon_{Sn}) \cdot \frac{\lambda_{Sn}}{2} + A_{S1} \cdot (M_1 + \varepsilon_1) \cdot \frac{\lambda_1}{2} \qquad (13)$$

Due to nearby the standard industrial environment with air temperature of 20° C., pressure of 101.325 kPa and variation of the water vapor pressure of 0.36 kPa, the variation of the $A_{S1}$-coefficient is about 0.03. Firstly, $A_{S1}$ is regarded as a fixed constant. Considering the uncertainty $u(\lambda_{Sn})$ of $\lambda_{Sn}$, the uncertainty $u(\lambda_1)$ of $\lambda_1$, the measurement uncertainty $u(\varepsilon_n)$ of the fractional fringe $\varepsilon_n$ of $\lambda_{Sn}$ and the measurement uncertainty $u(\varepsilon_1)$ of the fractional fringe $\varepsilon_1$ of $\lambda_1$, the measurement uncertainty $u_1(D)$ of the absolute distance D is given by $$u_1(D) = \left[((1 - A_{S1}) \cdot n_{Sn} D)^2 \cdot \left(\frac{u(\lambda_{Sn})}{\lambda_{Sn}}\right)^2 + (A_{S1} \cdot n_1 D)^2 \cdot \left(\frac{u(\lambda_1)}{\lambda_1}\right)^2 + \left(\left((1 - A_{S1}) \cdot \frac{\lambda_{Sn}}{2}\right)^2 + \left(A_{S1} \cdot \frac{\lambda_1}{2}\right)^2\right) \cdot \left(\left(\frac{2}{\lambda_1}\right)^2 u^2(\Delta l) + \left(\frac{2\Delta l}{\lambda_1^2}\right)^2 u^2(\lambda_1)\right)\right]^{\frac{1}{2}} \qquad (14)$$

In the embodiment, the wavelengths $\lambda_1$ and $\lambda_2$ emitted by the first laser 1 and the second laser 2 are locked to an optical femtosecond comb for frequency stabilizing, and the relative uncertainties of them are $u(\lambda_1)/\lambda_1 = u(\lambda_2)/\lambda_2 = 1.0 \times 10^{-11}$. Then the relative uncertainty of the synthetic wavelength $\lambda_{Sn}$ formed by $\lambda_1$ and $\lambda_2$ is $u(\lambda_{Sn})/\lambda_{Sn} = 1.0 \times 10^{-10}$, and the standard uncertainty of $\lambda_1$ is $u(\lambda_1) = 6.31 \times 10^{-12}$ μm. The positioning accuracy of the first cube-corner prism 7, that is, the uncertainty of $\Delta l$, is $u(\Delta l) = 10^{-4}$ and $\Delta l < \lambda_1/2$. As $\lambda_1 = 631$ nm and $\lambda_{2n} = 636$ nm, $\lambda_{Sn} = 80.2$ μm and $A_{S1} = 35.6$ are obtained. In the standard industrial environment with air temperature of 20° C., pressure of 101.325 kPa and humidity of 50%, $n_1 = 1.000271391$ and $n_2 = 1.000271304$ are obtained according to the Edlén equations, and $n_{Sn} = 1.000263561$ is obtained according to Eq. (12). Assuming the absolute distance D=100 m and the displacement of the first corner-cube prism 7 $\Delta l = 0.25$ μm, substituting these parameters into Eq. (14), we obtain that the measurement uncertainty of the absolute distance D is $u_1(D) = 0.56$ μm and the corresponding relative uncertainty is $u_1(D)/D = 5.6 \times 10^{-9}$.

When the measurement uncertainties of humidity and temperature is less than ±1.0% RH (+15° C.~+25° C.) and 50 mK, respectively, the measurement uncertainty of the absolute distance induced by the variations of environmental parameters is $u_2(D)/D=2.4\times10^{-8}$ by analyzing the air refractive index compensation with the two-color method.

Combining $u_1(D)$ and $u_2(D)$ mentioned above, we obtain that for the absolute distance of 100 m, the relative measurement uncertainty of the absolute distance self-corrected the air refractive index by the two-color method based on a single wavelength and a synthetic wavelength in the present invention is $$\frac{u(D)}{D} = \frac{\sqrt{u_1^2(D)+u_2^2(D)}}{D} \approx 2.5\times10^{-8}$$

It can be seen that, the present invention provides a method of air refractive index correction for absolute long distance measurement, and the relative uncertainty of $2.5\times10^{-8}$ is achieved for the absolute distance measurement with a range of 100 m. Using the method of the present invention, the influence of air disturbance in the measurement environment can be reduced, and the measurement of absolute distance and the full-path compensation of air refractive index is realized at the same time. The method of the present invention has the advantages of high accuracy, wide range of application and easy to realize.

The above embodiment is intended to explain the present invention, but not to limit the present invention. Any modification and change made to the present invention within the protection scope of the spirit and the Claims of the present invention fall in the protection scope of the present invention.

What is claimed is:

1. A method of air refractive index correction for an absolute long distance measurement, comprising the following steps:
   (1) emitting a laser beam with a constant single wavelength $\lambda_1$ by a first laser, sequentially emitting a laser beam with a variable wavelength from small to large $\lambda_{21}<\lambda_{22}<\ldots<\lambda_{2i}<\ldots<\lambda_{2n}$ by a second laser, the two laser beams being combined at a first polarizing beam splitter to form an orthogonal linearly polarized beam, and projecting the orthogonal linearly polarized beam onto a laser interferometric system constituted by a beam splitter, a second polarizing beam splitter, a first cube-corner prism and a second cube-corner prism;
   (2) with the laser interferometric system, forming a synthetic wavelength chain from large to small $\lambda_{S1}>\lambda_{s2}>\ldots>\lambda_{Si}>\ldots>\lambda_{Sn}$ using a single wavelength $\lambda_1$ and a variable wavelength $\lambda_{21}<\lambda_{22}<\ldots<\lambda_{2i}<\ldots<\lambda_{2n}$, wherein $\lambda_{Si}=\lambda_1\lambda_{2i}/(\lambda_{2i}-\lambda_1)$, and $i=1, 2, \ldots, n$;
   obtaining in turn a series of estimate values of optical distance $L_{S1}, L_{S2}, \ldots, L_{Si}, \ldots, L_{Sn}$ with gradually increasing measurement accuracy, and each order of the synthetic wavelength chain complying with a transition condition of $u(L_{S(i-1)})<\lambda_{Si}/4$, wherein $u(L_{S(i-1)})$ is an uncertainty of the estimate value $L_{S(i-1)}$ of optical distance which is determined by using an $i-1^{th}$ order synthetic wavelength $\lambda_{S(i-1)}$, and $i=2, 3, \ldots, n$;
   (3) satisfying $\lambda_{S1}/2>L$ for a first order synthetic wavelength $\lambda_{S1}$ and an optical distance L corresponding to an absolute distance D, and satisfying $u(L_{Sn})<\lambda_1/4$ for an uncertainty $u(L_{Sn})$ corresponding to a minimum synthetic wavelength $\lambda_{Sn}$ and the single wavelength $\lambda_1$; and
   (4) simultaneously obtaining optical distances $L_{Sn}$ and $L_1$ respectively corresponding to the minimum synthetic wavelength $\lambda_{Sn}$ and the single wavelength $\lambda_1$, and obtaining a corrected absolute distance according to the principle of a two-color method for air refractive index correction: $D=L_{Sn}-A_{S1}(L_{sn}-L_1)$,
   wherein $A_{S1}=(n_{Sn}-1)/(n_{Sn}-n_1)$, $A_{S1}$ is a dispersion coefficient corresponding to $\lambda_{Sn}$ and $\lambda_1$, and $n_{Sn}$ and $n_1$ are air refractive indexes corresponding to $\lambda_{Sn}$ and $\lambda_1$ respectively, and calculated using Edlén equation.

2. The method of air refractive index correction for the absolute long distance measurement according to claim 1, wherein wavelengths of the laser beams emitted by the first laser and the second laser belong to a same spectral band, and the minimum synthetic wavelength $\lambda_{Sn}$ is constructed by the two single wavelengths $\lambda_1$ and $\lambda_{2n}$ in a same spectral band.

* * * * *